3,412,144
PROCESS FOR PRODUCING SULFENAMIDES
Joseph E. Dunbar and Joan A. Rogers, Midland, Mich., assignors to The Dow Chemical Company, Midland, Mich., a corporation of Delaware
No Drawing. Filed Oct. 4, 1965, Ser. No. 492,879
4 Claims. (Cl. 260—501.19)

ABSTRACT OF THE DISCLOSURE

Sulfenamides and amine salts of sulfinic acids are prepared by reacting a thiolsulfonate with a primary aromatic amine.

---

The present invention is directed to a new and novel process for producing sulfenamides and the amine salts of sulfinic acid. The new process of the present invention comprises reacting a thiolsulfonate corresponding to the formula

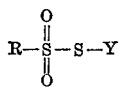

with a primary aromatic amine corresponding to the formula

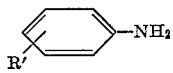

In this and succeeding formulae, R represents alkyl and aryl and R' represents a member of the group consisting of hydrogen, methyl, methoxy and ethoxy; and Y represents a member of the group consisting of o-nitrophenyl, p-nitrophenyl and 2,4-dinitrophenyl. In the present specification and claims alkyl is employed to represent an alkyl group containing from 1 to 2, to 3, to 4 and up to 8 carbon atoms, inclusive, and aryl represents phenyl or halophenyl or nitrophenyl or lower alkylphenyl or lower alkoxyphenyl or naphthyl, or halonaphthyl or nitronaphthyl or lower alkyl naphthyl or lower alkoxynaphthyl or any combination of said phenyl, naphthyl, substituted phenyl or substituted naphthyl groups. Thus, the term aryl is employed to be inclusive of phenyl, substituted phenyl, naphthyl and substituted naphthyl wherein the substituents are selected from halo (chlorine or bromine), nitro, lower alkyl and lower alkoxy. The expressions lower alkyl and lower alkoxy are employed in the specification and claims to represent alkyl and alkoxy groups containing from 1 to 2, to 3, to 4 carbon atoms, inclusive, such as methyl, ethyl, propyl, isopropyl, butyl, sec.-butyl and tert.-butyl.

It is believed that the process of the present invention can be represented by the following equation

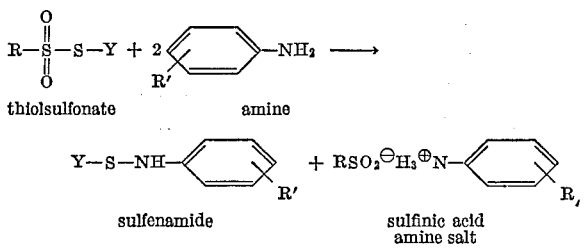

The reaction is conveniently carried out in the presence of an inert organic liquid as reaction medium. Representative inert organic liquids include diethyl ether, methylene chloride, benzene, methanol, ethanol, isopropanol, chloroform, xylene, toluene, acetone, nitromethane, methyl ethyl ketone and acetonitrile. The reaction proceeds readily at temperatures at which the desired sulfenamide and the sulfinic acid amine salt products are formed. Convenient temperatures to be employed include temperatures between 60 and 120° C. with temperatures between 70 and 100° C. being preferred.

The proportions of the reactants to be employed are not critical. The process of the present invention results in the formation of at least a small quantity of the products when the reactants are contacted together in any proportion. The reaction consumes the amine in molar quantities equivalent to two times the molar quantity of the thiolsulfonate employed. The use of the reactants in amounts which exceed the theoretical amount consumed has no adverse affect upon the process of the present invention. However, the use of large excesses are not recommended as they are uneconomical.

In carrying out the present invention the thiolsulfonate and the desired amine are contacted together in any order or fashion. In a convenient procedure, the reactants are combined in the presence of an organic liquid reaction medium. The temperatures of the reaction mixture is maintained within the desired temperature range for a period of time. In some cases the sulfinic acid amine salt precipitates in the reaction mixture as a solid material. In such cases the temperature of the reaction mixture is maintained in the reaction temperature range until there is a substantial cessation in the precipitation of the sulfinic acid amine salt.

The sulfenamide and sulfinic acid amine salt are separated from the reaction mixture and each other, by conventional procedures. When the salt has precipitated during the reaction period, it can be removed by filtration or decantation. In those cases when the salt has not precipitated during the reaction period, the reaction mixture can be cooled, concentrated or diluted with a non-polar organic solvent such as diethyl ether in order to facilitate the precipitation of the salt. Once precipitated the salt can be separated by filtration or decantation. In other instances the sulfinic acid amine salt is sufficiently water soluble that it can be extracted from the reaction mixture and water insoluble sulfenamide by washing the reaction mixture with water. Once the salt is separated from the reaction mixture, it can be further purified by recrystallization, washing with a non-polar organic solvent such as diethyl ether, etc.

The sulfenamide can be isolated from the reaction mixture by a variety of conventional procedures. The sulfenamide can be separated from salt-free or salt containing reaction mixture by fractional distillation. In another convenient procedure, the sulfenamide can be isolated from the salt-free reaction mixture by heating the reaction mixture to remove all of the low boiling constituents and obtain the sulfenamide as a residue, which can be washed or crystallized if further purification is desired.

The following examples are merely illustrative and are not intended to be limiting.

EXAMPLE 1

Production of N-(p-tolyl)-o-nitrobenzene-sulfenamide p-Toluidine (51.4 grams; 0.480 mole) and o-nitrophenyl benzenethiolsulfonate (35.4 grams; 0.120 mole) were dispersed in 300 milliliters of ethanol and the resulting dispersion was heated at the boiling temperature and under reflux for 1.5 hours. Following the reaction period, the ethanol was removed by evaporation in vacuo to obtain a residue. This residue was washed with ether to separate the ether soluble N-(p-tolyl)-o-nitrobenzene-sulfenamide product from the ether insoluble benzenesulfinic acid salt of p-toluidine. The ether fraction thus obtained was evaporated to dryness to obtain an orange oil. This orange residue crystallized upon trituration with isopropanol. The yellow, crystalline N-(p-tolyl)-o-nitrobenzenesulfenamide product was collected by filtration and recrystallized from isopropanol. The yellow crystals of the recrystallized product melted at 136–138° C.

EXAMPLE 2

Production of N-(p-methoxyphenyl)-o-nitrobenzenesulfenamide o-Nitrophenyl benzenethiolsulfonate (29.5 grams; 0.100 mole) and p-anisidine (49.2 grams; 0.400 mole) were dispersed in 300 milliliters of ethanol. Following the contacting of the reactants, the reaction mixture was processed in exactly the same manner as described in Example 1 to obtain the N-(p-methoxyphenyl)-o-nitrobenzenesulfenamide product as orange crystals melting at 138–140° C.

EXAMPLE 3

Production of N-phenyl-o-nitrobenzenesulfenamide and anilinium benzenesulfinate

Aniline (25.2 grams; 0.271 mole) and o-nitrophenylbenzenethiolsulfonate (20.0 grams; 0.067 mole) were dispersed in 250 milliliters of ethanol. The reaction mixture was heated at the boiling temperature and under reflux for 21.5 hours. Following the reaction period, the reaction mixture was distilled under reduced pressure to remove the low boiling constituents and obtain a residue. This residue was washed in ether. During the washing procedure, the ether insoluble benzenesulfinic acid salt of aniline precipitated as a crystalline solid and was collected by filtration and found to melt at 130–132.5° C. The ether filtrate was evaporated to dryness in vacuo to obtain a residue which was dissolved in hot isopropanol. Thereafter the hot isopropanol was allowed to cool, whereupon the N-phenyl-o-nitrobenzenesulfenamide product crystallized as a bright yellow crystalline solid melting at 94–97° C.

In a similar manner, the new process of the present invention can be employed to produce other sulfenamides and sulfinic acid salt compounds. Representative examples include:

N-(m-ethoxyphenyl-p-nitrobenzenesulfenamide (molecular weight 289) and the 4-n-butylbenzenesulfinic acid salt (molecular weight 243) of m-phenetidine by reacting together m-phenetidine and p-nitrophenyl p-n-butylbenzenethiolsulfonate.

N-(phenyl)-o-nitrobenzenesulfenamide (M.P. 94–97° C.) and the β-naphthylenesulfinic acid salt of aniline (molecular weight 285) by reacting together aniline and the o-nitrophenyl β-naphthylenethiolsulfonate.

N-(p-ethoxyphenyl)-o-nitrobenzenesulfenamide (molecular weight 289) and the p-n-butoxybenzenesulfinic acid salt of p-phenetidine (molecular weight 346) by reacting together p-phenetidine and o-nitrophenyl p-n-butoxybenzenethiolsulfonate.

N - (m - methoxyphenyl) - 2,4 - dinitrobenzenesulfenamide (molecular weight 321.3) and the n-hexanesulfinic acid salt of m-anisidine (molecular weight 273.3) by reacting together m-anisidine and 2,4-dinitrophenyl hexanethiolsulfonate.

N-(phenyl)-2,4-dinitrobenzenesulfenamide (molecular weight 291.3) and the benzenesulfinic acid salt of aniline (molecular weight 235.3) by reacting together aniline and 2,4-dinitrophenyl benzenethiolsulfonate.

The thiolsulfonate compounds employed herein can be prepared by known procedures. In a representative procedure, o-nitro-, p-nitro-, or 2,4-dinitrobenzenesulfenyl chloride is reacted with an alkali metal sulfinate corresponding to the formula

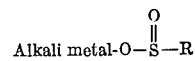

to produce the desired nitrophenyl thiosulfonate and the alkali metalhalide of reaction. The reaction is carried out in an organic liquid reaction medium such as chloroform or carbon tetrachloride and at a temperature of between 0 and 30° C. The desired nitrophenyl thiolsulfonate compound can be separated from the reaction mixture by conventional procedures.

Representative thiolsulfonate compounds to be employed in the present invention include:

o-nitrophenyl 2,3,5-trichlorobenzenethiolsulfonate,
o-nitrophenyl 4-bromobenzenethiolsulfonate,
2,4-dinitrophenyl 3-methoxybenzenethiolsulfonate,
o-nitrophenyl p-nitrobenzenethiolsulfonate,
p-nitrophenyl p-n-butylbenzenethiolsulfonate,
o-nitrophenyl octanethiolsulfonate,
o-nitrophenyl n-hexanethiolsulfonate,
2,4-dinitrophenyl n-pentanethiolsulfonate,
p-nitrophenyl 7-ethyl-2-naphthylenethiolsulfonate and
o-nitrophenyl 4-nitro-2-naphthylenethiolsulfonate.

We claim:
1. The process for making a sulfenamide and an amine salt of a sulfinic acid which comprises reacting a thiolsulfonate corresponding to the formula

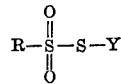

with a primary aromatic amine corresponding to the formula

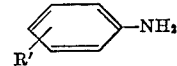

wherein R represents a member of the group consisting of alkyl, phenyl, substituted phenyl, naphthyl and substituted naphthyl wherein the substituents are selected from chloro, bromo, nitro, lower alkyl and lower alkoxy; Y represents a member of the group consisting of o-nitrophenyl, p-nitrophenyl and 2,4-dinitrophenyl; and R' represents a member of the group consisting of hydrogen, methyl, methoxy and ethoxy.

2. The process of claim 1 wherein the thiolsulfonate is o-nitrophenyl benzenesulfonate and the amine is p-toluidine.

3. The process of claim 1 wherein the thiolsulfonate is o-nitrophenyl benzenethiolsulfonate and the amine is p-anisidine.

4. The process of claim 1 wherein the thiolsulfonate is o-nitrophenyl benzenethiolsulfonate and the amine is aniline.

References Cited

UNITED STATES PATENTS 3,305,581  2/1967  Rogers ———————— 260—501

LORRAINE R. WEINBERGER, *Primary Examiner.*

J. NIELSEN, *Assistant Examiner.*